Patented Aug. 9, 1932

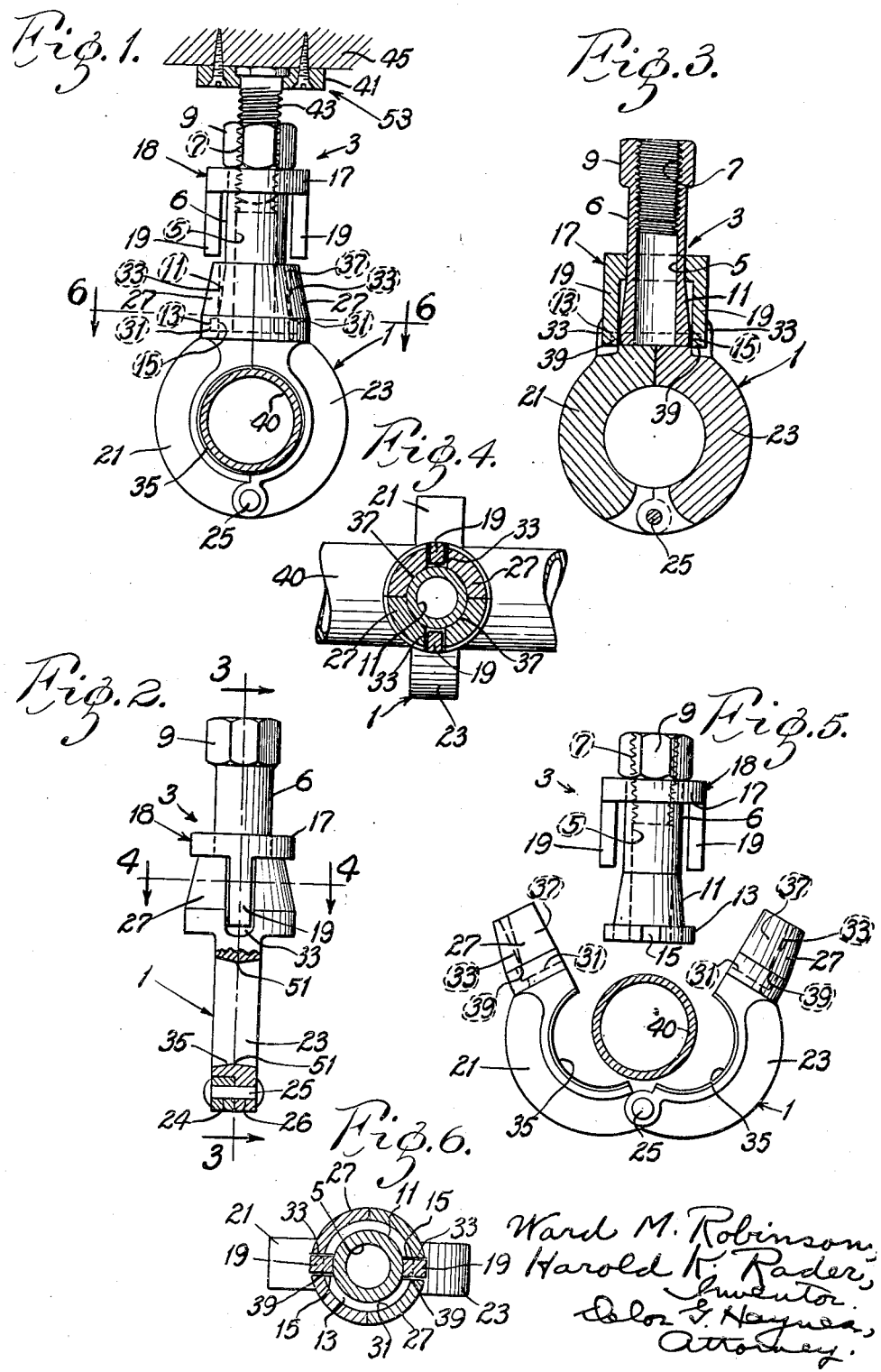

1,870,651

UNITED STATES PATENT OFFICE

WARD M. ROBINSON AND HAROLD K. RADER, OF PORT HURON, MICHIGAN, ASSIGNORS TO MUELLER BRASS COMPANY, OF PORT HURON, MICHIGAN, A CORPORATION OF MICHIGAN

HANGER

Application filed February 28, 1931. Serial No. 519,017.

This invention relates to supports, and with regard to certain more specific features, to supporting carriers for conduits and the like.

Among the several objects of the invention may be noted the provision of a two-element supporting member for metal conduits; and, the provision of a supporting member of the class described comprising a carrier and a connecting member, said carrier being adapted to open to receive a metal conduit, and being separable from said connecting member. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which is illustrated one of various possible embodiments of the invention, Fig. 1 is a side elevation showing the carrier supporting a conduit, and closed on a connecting member, but a locking portion being raised;

Fig. 2 is a front elevation showing parts broken away, the locking member being in locking position;

Fig. 3 is a vertical section taken on line 3—3 of Fig. 2;

Fig. 4 is a horizontal section taken on line 4—4 of Fig. 2 and showing a conduit in the carrier;

Fig. 5 is a side elevation showing the carrier open to receive a conduit and the connecting member; and, Fig. 6 is a horizontal section taken on line 6—6 of Fig. 1.

Similar reference characters indicate corresponding parts throughout the several views of the drawing.

Referring now more particularly to Figs. 1, 2 and 3, there is shown at numeral 1 a carrier adapted to fit around and support a conduit or the like. The carrier 1 also interlocks with and is supported by a connecting member 3. The connecting member 3 comprises a stem portion 6 which has a bore 5, the upper part of the bore 5 carrying internal threads 7. The upper part of the stem 6 has a hexagonal or like head 9 for providing a wrench hold or other purchase. The lower or base portion of the stem 6 has a gradually enlarged circumference, as shown at numeral 11, and the base thereof has an annular collar 13 formed therewith. The collar 13 has oppositely disposed notches 15. A locking member 18 comprising ring 17 having downwardly extending lugs 19 is movably mounted on the stem 6 between the head 9 and the collar 13, said lugs 19 cooperatively engaging said notches 15.

The carrier 1 comprises two cradle arms 21 and 23 hinged at a rabbet joint at one end by a pin 25 through respective bores 24 and 26. The other ends of these arms 21 and 23 have extended portions 27. Each extension 27 is shaped on the inside to receive one-half of the lower portion of the stem 3, that is the collar 13 and the conically shaped portion 11. Thus each portion 27 has a semi-annular groove 31 and a bore 37, so formed that when the two portions 27 are juxtapositioned, as when the carrier is in a closed position, Figs. 1 and 3, the grooves 31 form an annular groove adapted to receive the collar 13, and the grooves 37 form a bore 37 which conforms in shape to the conically shaped portion 11 of the sleeve 3. When the conical portion 11 and the collar 13 of the sleeve 3 are positioned in the bore 37 and the groove 31, the connector number 3 is interlocked with the carrier 1.

The extensions 27 of the carrier 1 also have slots 33, for receiving the lugs 19 of the ring 17, as the locking member is pushed into place to lock the extensions 27 over the connector 3. The lugs 19 also extend into the inside of the extensions 27, through openings 39, and slide into the notches 15 of the collar 13 (see Fig. 6).

The inner faces 35 of the arms 21 and 23 are shaped to conform to the contour of the conduit to be supported by the carrier 1. In Figs. 1, 3 and 5, the inner surfaces 35 of the carrier 1 have a semi-circular shape to provide a complete circular opening when the arms 21 and 23 are closed. It is to be understood, however, that the surfaces 35 may be specifically manufactured in any shape to conform to the form of any special conduit or the like to be supported. As shown at numeral 51, Fig. 2, the inner faces 35 present a narrow contacting surface which presses into and firmly holds a conduit supported by the carrier.

At numeral 53, Fig. 1, there is shown a member for attaching the connector 3 to a wall or the like 45. The member 53 may comprise, as shown, a socket 41 adapted to be fastened to the wall 45, and having a threaded bolt 43 extending therefrom, for threadably receiving the connector 3. It is to be understood that any kind of supporting member 53 may be used.

The invention may be installed to support a conduit 39 as follows:

The connector 3 is threaded onto a bolt 43 of a support 53 by the threads 7. The bolt 43 may pass through the threaded portion 7 into the open bore 5 as the proper spacing between the wall 45 and the connector 3 is attained. A wrench applied to the hexagonal portion 9 of the stem 6 may aid the operator in threading the stem 6 on the bolt 43.

The carrier 1, in its opened position as shown in Fig. 5, is slipped over and closed on the conduit 40. At the same time the extensions 27 are closed over the enlarged portion 11 and the collar 13 of the stem 6. The stem 6 is positioned so that the notches 15, of the collar 13, align with the slots 33 and the openings 39 of the extensions 27. It is understood that the pipe or conduit 39, the carrier 31, the sleeve 3, and the locking member 18 are now in the position shown in Fig. 1. The ring 17 is now rotated if necessary on the stem portion 6, to position the lugs 19 in line with the slots 33 of the extensions 27, and is then pushed down along the stem 6, the lugs 19 locking the extensions 27 together and slipping into the notches 15 of the collar 13, thereby preventing any rotational movement between the carrier 1 and connector 3.

If the spacing between the pipe or conduit 40 and the wall 45 is not correct, the operator need only to raise the locking member 18 a distance sufficient to pull the lugs 19 out of locking position with the collar 15. This allows the operator to thread the stem 6 up or down on the bolt 43, thereby moving the member 3 away from or closer to the wall 45. When the correct spacing is attained, the stem 6 is again positioned so that the notches 15 and the slots 33 aline, and the ring 17 is again dropped to position the lugs 19 in the slots or notches 15, thereby locking the carrier 1 and the connector 3 together. In this position any movement between the carrier 1 and the connector 3 is positively prevented and thus any further adjustment of the spacing between the pipe 39 and the wall 45 is prevented until the locking member 18 is raised.

The stem 6 may have an externally threaded portion adapted to thread into a wall or the like, rather than the internally threaded portion 7.

The interlocking arrangement between the connector and the carrier provides a positive fastening and yet relieves the locking member 18 of any strain. The vertical force is taken by the collar 13 and the extensions 27. There are no angular components to force the extensions 27 apart.

An advantage of the hanger comprises the flexibility with which it may be applied to a conduit. Thus the hangers may be applied to pipes already in position and connected. It is not necessary to slide the hanger over the end of the pipe. Further the spacing between the pipe and wall is adjustable, through the hanger, even while the pipe is in position in the hanger. Inasmuch as the carrier and connector, of the hanger, are separable the carrier does not interfere during the fastening of the connector to the wall. Also, the device comprises only two separable elements, thereby simplifying handling of the same. The ring 17 and lugs 19 may be integrated from as many pieces as may suit a given manufacturing arrangement. For instance the ring may comprise split halves soldered together after being positioned around the stem 6 and the lugs 19 may be integral or fastened to the ring 17 by soldering into pegways or otherwise.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

1. A hanger comprising a connecting member adjustable by rotation, a carrier having at least two separate, cooperating arms, said member and carrier being engageable for relative rotative but not relative longitudinal movement, and an adjustably movable lock adapted when in one position to hold said arms together and to positively lock them against rotation with respect to the connecting member and in another position to unlock the arms from one another and from the connecting member, said connecting member including a collar fitting a groove in the arms when they are together and said lock havng an extension fitting recesses in at least one of said arms and in said collar.

2. A hanger comprising a connecting member adjustable by rotation, a carrier having at least two separate, cooperating arms, said member and carrier being engageable for relative rotative but not relative longitudinal movement, and an adjustably movable lock adapted when in one position to hold said arms together and to positively lock them against rotation with respect to the connecting member and in another position to unlock the arms from one another and from the connecting member, said connecting member including a collar fitting a groove in the arms when they are together and said lock having an extension fitting recesses in at least one of said arms and in said collar, said arm and collar recesses being aligned.

3. A hanger comprising a connecting member having a collar and being adjustable by rotation, a carrier comprising separate arms adapted to be enclosed over a device to be supported, said arms having means thereon to engage said collar, and a lock rotatably and longitudinally movable along the connecting member, said lock being adapted to have a key portion thereof introduced into recesses in the collar and arms to prevent opening of the arms or rotation thereof.

4. A hanger comprising a connecting member and a carrier, said connecting member having a base portion, said carrier having at least two arms hinged at one pair of juxtaposed ends, said other pair of juxtaposed ends being adapted to close on said base portion, and means on said base portion for interlocking with said ends, a locking member mounted on said connecting member comprising a ring having lugs extending therefrom, and said other pair of ends having external slots for receiving said lugs when said locking member is in a locking position.

5. A conduit hanger comprising a connecting member having a base portion with an annular contour formed thereon and a carrier having at least two arms hinged together at one pair of ends, the non-hinged ends being shaped to conform to and close over said base portion and the annular contour thereon when said ends are juxtapositioned, and a locking member on said connecting member adapted to retain said ends in a closed and non-rotatable position, said locking member comprising a ring having lugs intersecting recesses associated with the arms and said annular contour.

In testimony whereof, we have signed our names to this specification this 19th day of February, 1931.

WARD M. ROBINSON.
HAROLD K. RADER.